United States Patent [19]

Schmitt

[11] 4,067,456
[45] Jan. 10, 1978

[54] APPARATUS FOR ARRANGING AND STACKING NONRIGID ARTICLES

[75] Inventor: Robert A. Schmitt, Vancouver, Wash.

[73] Assignee: Columbia Machine, Inc., Vancouver, Wash.

[21] Appl. No.: 637,940

[22] Filed: Dec. 5, 1975

[51] Int. Cl.² .......................................... B65G 57/24
[52] U.S. Cl. ................................. 214/6 P; 214/6 G
[58] Field of Search .................. 214/6 G, 6 P, 6 DK; 198/105, 235

[56] References Cited

U.S. PATENT DOCUMENTS

| 1,737,762 | 12/1929 | Howe | 198/105 X |
| 3,045,802 | 7/1962 | Miller | 214/6 P X |
| 3,164,080 | 1/1965 | Miller | 214/6 P X |
| 3,176,858 | 4/1965 | Johnson | 214/6 P |
| 3,247,981 | 4/1966 | Johnson | 214/6 P |
| 3,294,257 | 12/1966 | Davies et al. | 214/6 P |
| 3,420,385 | 1/1969 | Verrinder | 214/6 P |
| 3,698,572 | 10/1972 | Dahlem et al. | 214/6 DK |
| 3,833,132 | 9/1974 | Alduk | 214/6 G |

*Primary Examiner*—L. J. Paperner
*Attorney, Agent, or Firm*—Kolisch, Hartwell, Dickinson & Stuart

[57] ABSTRACT

Apparatus for arranging and stacking articles including an infeed conveyor in which a rotator is mounted, operable to physically lift an article from the conveyor and rotate it to a desired orientation. Downstream from the rotator is a layer arranging table including elongate rollers powered for rotation in the same direction as the infeed conveyor to carry articles onto the arranging table. A plurality of endless conveyor chains are interposed between the rollers with their upper reaches driven in a direction transversely of the direction of movement of an article on the infeed conveyor. The rollers and chains are shiftable vertically relative to each other so that an article is supported on its underside and positively carried either in the direction of the infeed conveyor or transversely thereof. An elongate carriage is mounted for vertical shifting relative to the arranging table at the downstream and thereof. A powered roller bed is mounted on the carriage for movement longitudinally thereof between a position adjacent the arranging table and a position spaced downstream therefrom over an article receiving area. A fence is shiftable into a position behind articles on the roller bed whereby on return shifting of the roller bed articles are stripped therefrom onto the article receiving area. Powered means for shifting the carriage vertically is operable to press the roller bed down atop previously deposited layers to flatten the tops thereof to receive the next layer.

5 Claims, 11 Drawing Figures

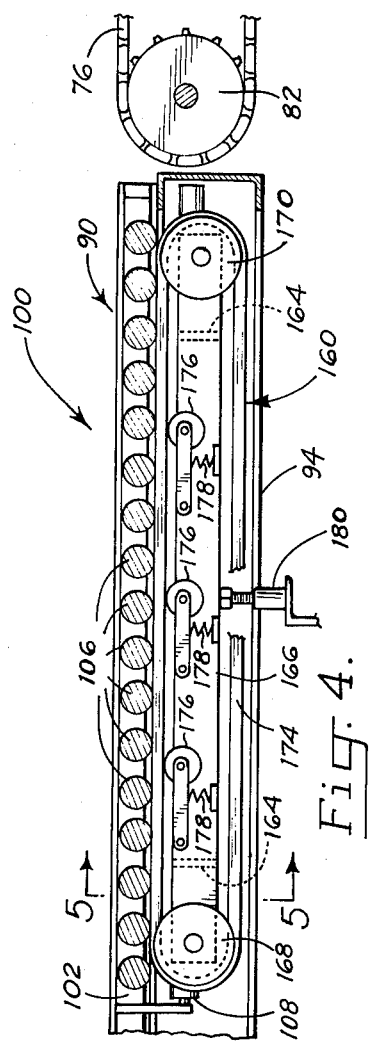
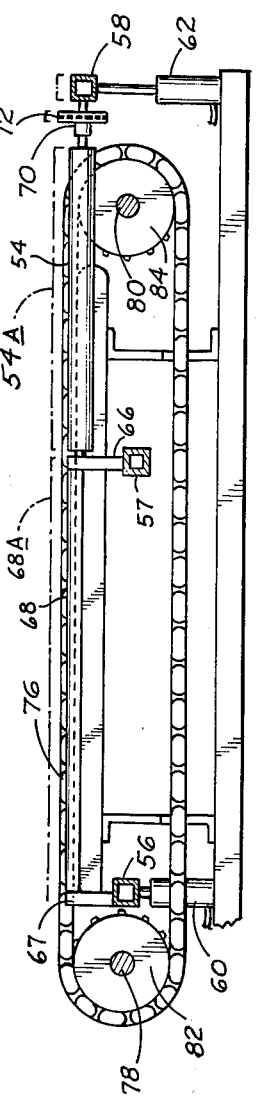
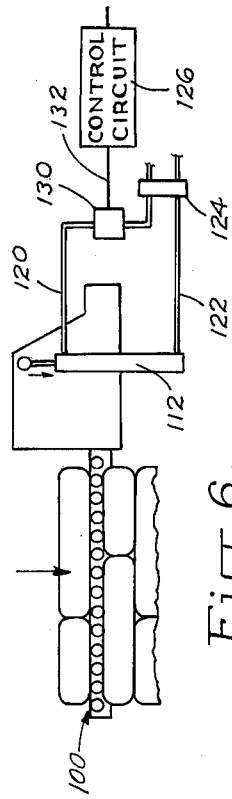
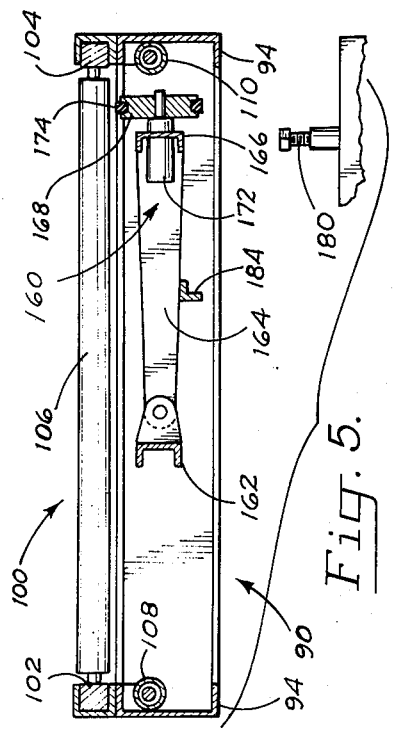
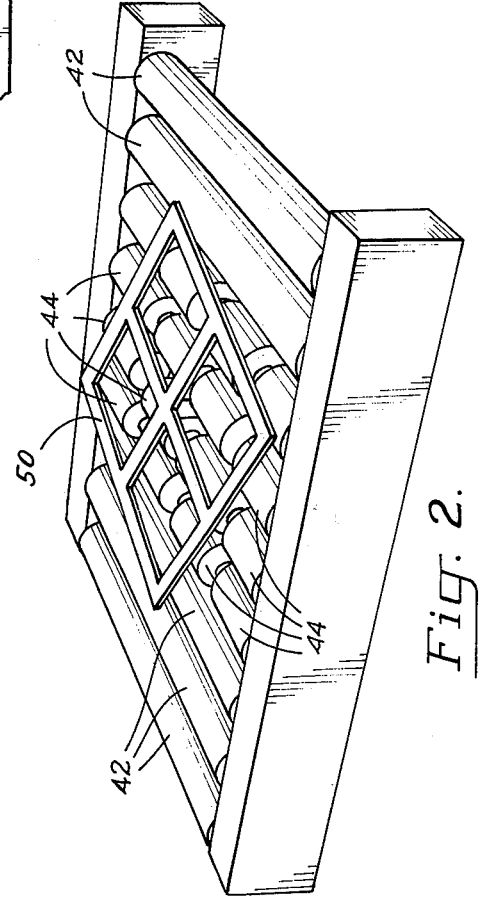

APPARATUS FOR ARRANGING AND STACKING NONRIGID ARTICLES

BACKGROUND AND SUMMARY OF THE INVENTION

The invention relates to improved apparatus for arranging and stacking nonrigid articles in multiple layers.

Apparatus is presently manufactured which is capable of arranging a plurality of substantially rigid rectangular containers, such as boxes or cartons, in a selected pattern to form a layer, and then stacking such layers one atop the other on a pallet or other support to form a tiered stack. Such known apparatus is generally well suited for handling substantially rigid articles, but is lacking in its ability to handle nonrigid articles, such as bags of loose, or granular materials, as bagged cement, flour, etc.

A problem with most previous apparatus is that it generally operates to produce a pushing force against an upright side of an article or layer of articles to urge them to move in a selected direction along a path over substantially stationary supports. In other apparatus the turning of the articles to produce a desired arrangement within a layer is produced by stopping or physically pushing against one side of the article which may tend to deform the bag.

A general object of the present invention is to provide novel apparatus for arranging multiple nonrigid articles in a layer and stacking the layers in multiple tiered stacks, which apparatus overcomes the disadvantages of previous apparatus set out above in a simple and economic manner.

More specifically, an object of the invention is to provide apparatus for arranging and stacking nonrigid articles in which such articles are positively supported by and moved in a desired direction in the apparatus by support elements which are moved in the direction which the article is to be moved. Such apparatus thereby minimizes any possibility of deformation of the articles themselves or disorientation of the articles within a layer during the moving of either the individual articles or a layer of the articles.

A still further object is to provide such novel apparatus is which an article carrying carriage is vertically shiftable to carry an arranged layer of articles to a position over a previously deposited layer, and to thereafter deposit its layer upon the previously deposited layer, with the carriage including a roller bed having power driven article support rollers which when driven under power are operable to support and positively convey a layer of articles in a desired direction in the apparatus.

Yet another object of the present invention is to provide such apparatus in which the roller bed on the carriage may be extended to a position overlying a previously deposited layer of nonrigid articles and be pressed downwardly against the top of such articles to compress and flatten them to receive the next layer in the stack.

A still further object is to provide such apparatus which includes novel sensing means for determining the magnitude of pressure exerted against the top of a layer for flattening the same, thus to allow selectivity in operation of such flattening device.

These and other objects and advantages will become more fully apparent as the following description is read in conjunction with the drawings.

DRAWINGS

FIG. 2 is an enlarged perspective view of an article rotator in the apparatus;

FIG. 3 is an enlarged cross-sectional view taken generally along the lines 3—3 in FIG. 1;

FIG. 4 is an enlarged cross-sectional view taken generally along the line 4—4 in FIG. 1;

FIG. 5 is a cross-sectional view taken generally along the line 5—5 in FIG. 4;

FIG. 6 is a schematic side elevation view of a pallet carriage in the apparatus and an operator therefor during a portion of the operating sequence;

DETAIL DESCRIPTION OF AN EMBODIMENT OF THE INVENTION

Figure 1:
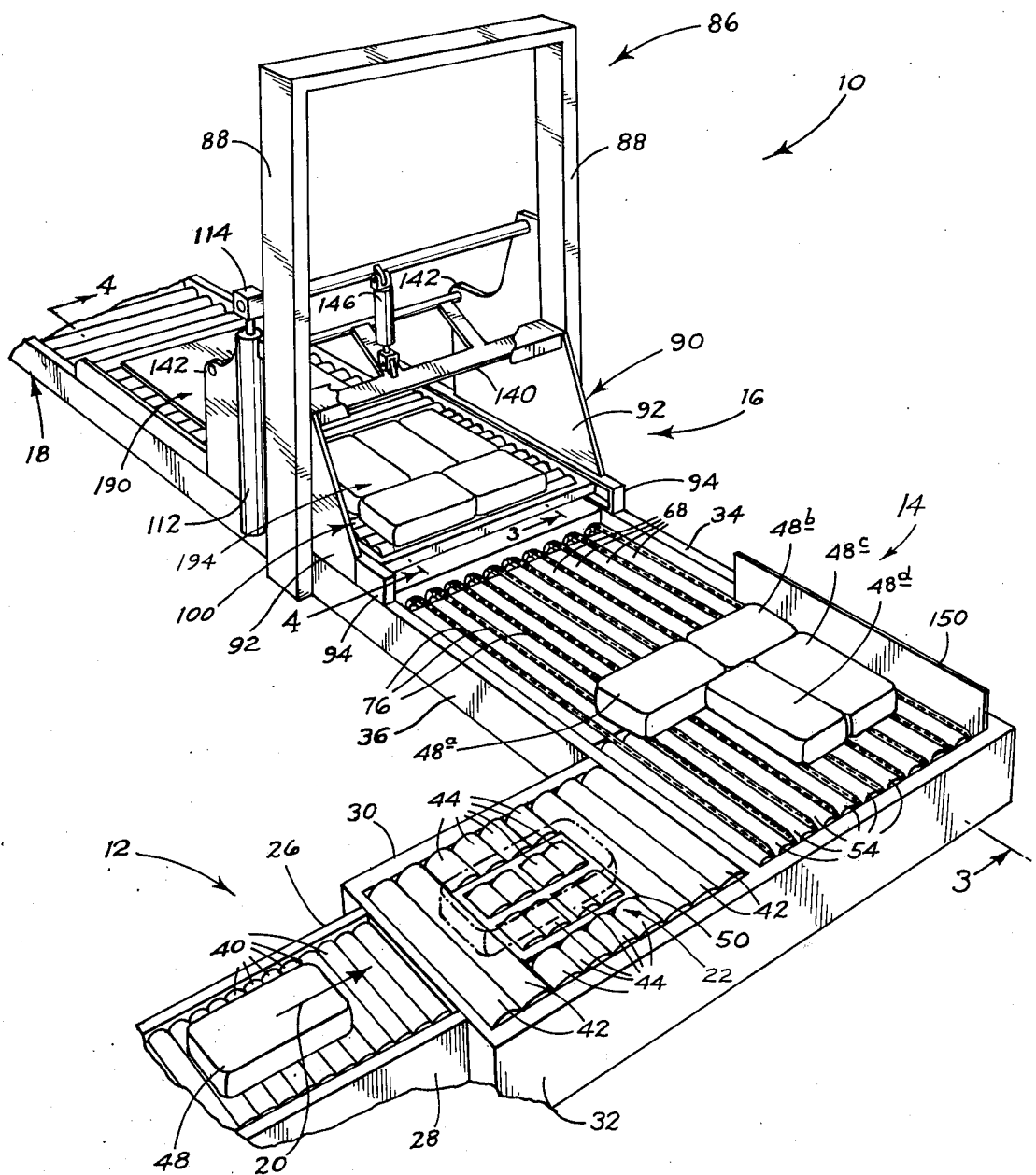
FIG. 1 is a perspective view of apparatus constructed according to an embodiment of the invention.

Referring to the drawings, and first more specifically to FIG. 1, at 10 is indicated generally apparatus according to an embodiment of the invention. In general terms, the apparatus includes an article feed, or infeed, section or conveyor 12, a layer arranging table, or area, 14, an article stacking section 16, and an article receiving section 18. Generally speaking, nonrigid articles, such as bags, are conveyed along a path on feed section 12 in the direction of arrow 20 to a rotator 22 which is operable to lift and turn selected articles 90°. The articles continue onto arranging table 14 where they are laid up into a layer having a preselected pattern. The layer is transferred to stacking section 16 which is operable to transfer the layer to receiving section 18 and thereafter stack subsequent layers in vertically stacked tiers upon the receiving section.

The main frame for the apparatus includes a pair of laterally spaced, substantially parallel side rails 26, 28 and another pair of laterally spaced, substantially parallel side rails 30, 32 secured to and extending parallel to side rails 26, 28 in a downstream direction therefrom. Another pair of laterally spaced, substantially parallel side rails 34, 36 are secured to and disposed at right angles to the downstream ends of side rails 30, 32.

A plurality of horizontal, laterally spaced, elongate power driven rollers 40 are journaled adjacent their opposite sets of ends in rails 26, 28. Other elongate, laterally spaced, power driven rollers 42 are journaled in rails 30, 32. Intermediate spaced sets of rollers 42 are short rollers 44 which are disposed in a pattern as illustrated in FIGS. 1 and 2. Rollers 40, 42, 44 all are disposed with their upper surfaces lying in a substantially common horizontal plane. The rollers are operable to support the undersides of articles, such as a flexible bag, as illustrated at 48, which may be filled with a loose or granular material, and the rollers are operable to convey such articles in succession in the direction of arrow 20.

A substantially horizontally disposed flat grid plate 50 is constructed to nest within the spaces provided between various sets of rollers 44 as illustrated in FIG. 1. Plate 50 is mounted on the rod end of an upright ram for shifting between the lowered position illustrated in FIG. 1 below the upper surfaces of rollers 44 and a raised position thereabove as illustrated in FIG. 2. Plate 50 also is rotatable under power about an upright axis as illustrated in FIG. 2 to rotate articles conveyed thereto. With such a rotator a bag conveyed thereto may be lifted physically from the rollers, and rotated as desired (in this case 90°) about an upright axis, and then lowered again to the surface of the rollers for support and carrying in a downstream direction in the apparatus.

Article arranging table, or section, 14 includes a plurality of elongate, substantially parallel, laterally spaced rollers 54 which extend substantially parallel to rollers 40, 44. Referring to FIG. 3, a plurality of elongate, parallel, square tubular beams 56, 57, 58, mounted within the confines of side rails 34, 36 and paralleling side rails 30, 32 define portions of a frame which supports rollers 54. The frame, of which beams 56, 57, 58 are a part, is mounted on the rod ends of upright rams, such as those indicated at 60, 62, for vertical shifting, as will be described below. The right set of ends of rollers 54 as illustrated in FIGS. 1 and 3 are journaled for rotation in beam 58, and the left set of ends of rollers 54 are journaled for rotation in a plurality of support posts such as post 66 which are secured in positions projecting upwardly from and spaced longitudinally along beam 57. Another set of support posts 67 are secured in positions projecting upwardly from beam 56 and are spaced along beam 56 in positions corresponding to the positions of posts 66 on beam 67. A plurality of elongate, planar support slats 68 are secured at opposite sets of their ends to the upper ends of support posts 66, 67 whereby the slats are laterally spaced from each other, with each slat axially aligned with a roller 54. The rollers and slats are so supported in the apparatus that their upper surfaces occupy a substantially common horizontal plane.

Sprockets, such as that indicated at 70 in FIG. 3, are secured to one set of ends of rollers 54. These sprockets are engaged by one reach of a power driven drive chain 72 whereby the rollers may be rotated under power.

Interposed in the spaces between rollers 54 and slats 68 are a plurality of conveyor chains 76. A pair of laterally spaced shafts 78, 80 paralleling beams 56, 57, 58 have sprockets 82, 84 keyed thereon about which chains 76 are trained to provide substantially horizontally extending upper reaches for the chains. One of the shafts is power driven to produce powered movement of the upper reaches of chains 76 to the left in FIGS. 1 and 3.

As is seen in FIG. 3, with rams 60, 62 retracted the upper surfaces of rollers 54 and slats 68 are spaced below the elevation of the upper reaches of chains 76. Upon extension of rams 60, 62, rollers 54 and slats 68 move to an elevation above the chains as illustrated at dot-dash outline 54A, 68A. When the rollers and slats are thus raised their upper surfaces lie in a substantially common horizontal plane with the upper surfaces of rollers 40, 42, 44.

Referring now to stacking section 16, it includes a substantially upright frame 86 having a pair of upright, laterally spaced columns 88. A carriage indicated generally at 90 is mounted for vertical movement along columns 88. The carriage includes a pair of laterally spaced side plates 92 having guide means thereon (not shown) which guide the carriage for movement vertically along columns 88.

The carriage also includes a pair of parallel, elongate, laterally spaced, horizontal guide arms, or tracks, 94 which are secured to and cantilevered outwardly at their opposite sets of ends from side plates 92. As is best seen in FIG. 1, one set of ends of arms 94 straddle a portion of the article receiving section 18 and the other set of ends of the arms is adjacent the downstream set of ends of chains 76 on the layer arranging table.

A roller bed indicated generally at 100 is mounted for horizontal movement longitudinally along arms 94. The roller bed is shiftable between a first position adjacent one set of arms 94 closely adjacent the downstream end of chains 76 on the layer arranging table, and another position adjacent the opposite set of ends of the carriage arms, wherein the roller bed is positioned over a portion of article receiving section 18.

As is best seen in FIGS. 4 and 5, roller bed 100 includes a pair of laterally spaced, parallel, elongate beams 102, 104 mounted for shifting longitudinally along arms 94. A plurality of elongate, substantially parallel, laterally spaced rollers 106 extend between and are journaled adjacent their opposite sets of ends for free rotation in beams 102, 104. The upper surfaces of rollers 106 lie in a substantially common horizontal plane.

A pair of elongate, substantially horizontal, double-acting, fluid-operated rams 108, 110 (see FIGS. 4 and 5) are positioned adjacent and substantially parallel to arms 94 of the carriage. These rams are connected at their cylinder ends to arms 94 and at their rod ends to roller bed 100. Extension and retraction of the rams shifts the roller bed between opposite ends of arms 94.

Referring still to FIGS. 4 and 5, drive means for rollers 106 is indicated generally at 160. Referring first to FIG. 5, an elongate beam 162 is anchored on carriage 90 beneath the roller bed. A pair of elongate support arms 164 are pivotally connected adjacent one set of their ends at laterally spaced positions to beam 162 and extend laterally outwardly therefrom toward one of carriage arms 94. An elongate beam 166 paralleling beam 162 is secured, as by welding, to the outer ends of arms 164. Journaled adjacent opposite ends of beam 166 are a pair of pulleys 168, 170. A motor 172 is operatively connected to pulley 168 for producing powered rotation of the pulley. An elongate, endless, flexible friction belt 174 is trained over pulleys 168, 170 with its upper reach underlying rollers 106. A plurality of idler pulleys 176 engage the upper reach of belt 174 intermediate pulleys 168, 170 and are biased upwardly thereagainst by springs 178.

A screw adjustable stop 180 is mounted in a stationary position beneath a center portion of beam 166 is mounted in a stationary position beneath a center portion of beam 166 whereby when carriage 90 is lowered into a position in which the tops of rollers 106 are in substantially a common horizontal plane with the upper reaches of chains 76 as illustrated in FIG. 4, beam 166 is pressed upwardly toward rollers 106, with the upper reach of belt 174 contacting rollers 106. When belt 174 is driven by motor 172 the rollers are caused to rotate under power.

When the carriage is raised from the elevation of chains 76 as illustrated in FIG. 5, arms 164, beam 166, and the pulleys and belts mounted thereon are allowed to drop a short distance from rollers 106. Movement of the drive means downwardly from rollers 106 is limited by a stop plate 184 which engages beam 166 whereby the belt is out of driving engagement with rollers 106 and the rollers are released for free rotation.

Disposed outwardly of side plates 92 of the carriage are a pair of elongate, upright, double-acting, fluid-operated rams such as that indicated at 112 in FIG. 1.

Rams 112 are secured at their cylinder ends to the supporting frame for the apparatus and are directly connected at their rod ends to carriage 90 through journal connectors 114. Such direct connection between the ram and carriage permits the carriage to be raised or lowered along the frame under power at the same speed at which the rams extend and contract. The direct connection assures that a unit change in length of rams 112 results in an equivalent unit change in the vertical position of the carriage.

Referring to FIG. 6, each of rams 112 has fluid supply and exhaust lines 120, 122 connected to opposite ends thereof. Lines 120, 122 are connected through a solenoid operated threeposition valve 124 to a source of fluid under pressure. Valve 124 is so constructed that when in a neutral position fluid is prevented from entering or escaping from lines 120, 122 and ram 112. When the valve is shifted to a first operating position fluid is supplied to one end of the ram for extending the ram and raising the carriage. When shifted to a second operating position fluid under pressure is supplied to the opposite end of the ram for retracting the ram and lowering the carriage. A control circuit 126 is operable to produce selected shifting of valve 124 between its three positions.

Connected in line 120 is a pressure sensing switch 130 which is operatively connected to control circuit 126 through a conductor 132. Switch 130 is constructed to sense the pressure of fluid within line 120 and upon sensing a predetermined pressure therein is operably to supply a signal through conductor 132 to circuit 126 to produce selecteed actuation of valve 124 as will be described in greater detail below.

Figure 8:
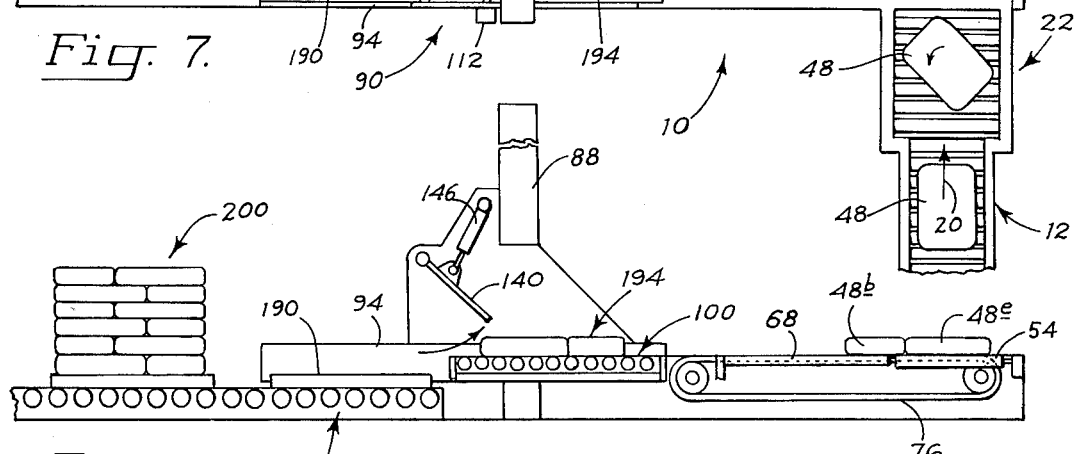
FIGS. 8-11 are schematic side elevation views of sequential steps in article stacking operation of the apparatus.
Figure 9:
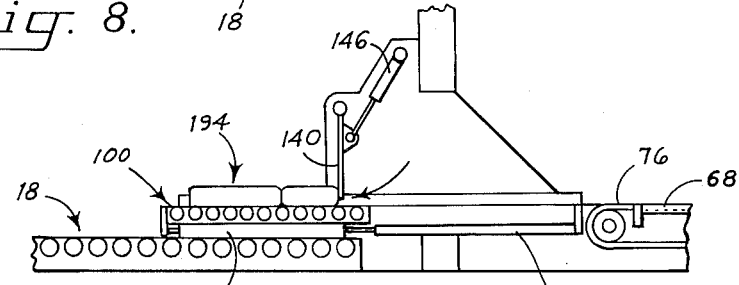
Figure 10:
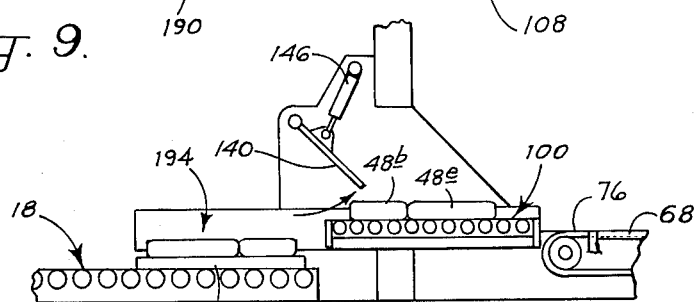
Figure 11:
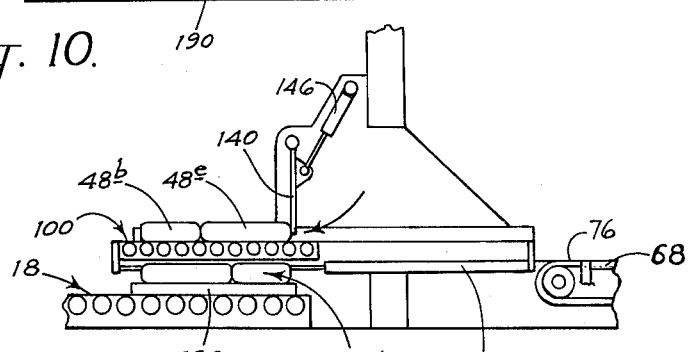

Extending between side plates 92 on carriage 90 is an elongate fence 140. The fence is pivotally mounted on side plates 92 by journal connections 142 at opposite ends of the fence and adjacent its upper edge margin. Journal connections 142 provide a substantially horizontal pivot axis for the fence spaced above the roller bed. The fence is swingable between a raised, inoperative position, as seen in FIGS. 1, 8 and 10, spaced a distance above the roller bed, and a lowered, substantially upright operative position, as seen in FIGS. 9 and 11, wherein its lower edge margin is closer to the roller bed.

An elongate, double-acting ram 146 is operatively connected to the fence, whereby retraction of the ram swings the fence to its raised, inoperative position, and extension of the ram lowers the fence to its operative position.

Explaining now the operation of the apparatus for forming a stack of nonrigid articles on receiving section 18, articles, such as the bags illustrated generally at 48 in FIGS. 1 and 6 are placed on power-driven infeed conveyor rollers 40 and are conveyed therealong in succession in the direction of arrow 20. Depending upon the desired arrangement and positioning for bags in a stack to be formed, selected ones of the bags may be turned 90° about a vertical axis from the orientation they have on passing along rollers 40.

As a bag, such as that indicated in dot-dashed outline in FIG. 1 at rotator 22 is to be turned, the ram under grid plate 50 is actuated to lift the grid plate and bag above the elevation of rollers 42 and the operation of rotator mechanism therein turns the grid plate 90° about an upright axis to rotate the bag as needed. The bag then is lowered again to rollers 44 and conveyed in the downstream direction.

Figure 7:
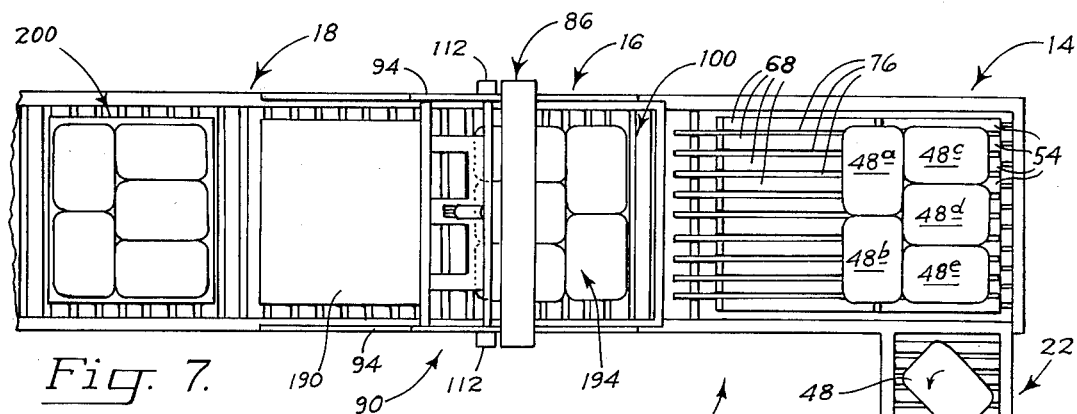
FIG. 7 is a schematic top plan view, on a reduced scale, of the apparatus illustrated in FIG. 1 during operation.

In FIGS. 1 and 7, at 48a, 48b, 48c, 48d, are indicated bags previously conveyed to the arranging table. Bags 48a, 48b, are positioned on the arranging table in the orientation they had when carried by infeed conveyor 12. Bags 48c, 48d have been turned 90° by rotator 22 from the orientation that they originally had on infeed section 12. As each such bag arrives at the arranging table, rollers 54 which have been raised by extension of rams 60, 62 support the undersides of the bags and carry them onto the arranging table until they are stopped by stop plate 150 extending upwardly from and paralleling side rail 36. When a row such as that including bags 48a, 48b, has been arranged as illustrated rollers 54 and slats 68 are lowered by retraction of rams 60, 62 and operation of chains 76 is operable to carry the bags to the left to the position illustrated in FIG. 1. The rollers and slats then are raised again with the bags carried to the left by chains 76 then being supported on slats 68. Additional bags such as those indicated at 48c, 48d then may be carried to a position on the arranging table after rotation 90° from the orientation which they had on the infeed conveyor. Three of such rotated bags of the sizes illustrated in the drawings may be placed alongside of the row of bags 48a, 48b, to form a patterned layer as illustrated in FIG. 7.

When the carriage is at the elevation of chains 76, and the roller bed is positioned at the ends of the carriage arms adjacent the layer arranging table, rollers 106 are driven under power by the drive means beneath the rollers. Thus, after a patterned layer of bags as illustrated has been formed on the tops of elevated rollers 54 and slats 68 the rollers and slats may be lowered by retraction of rams 60, 62 whereby the bags will be supported by chains 76. Powered movement of chains 76 serves to carry the patterned layer along a path toward the carriage. The layer may be off loaded from the chains and carried by the power rotated rollers 106 onto the carriage in the same direction and at substantially the same speed. With such positive support and powered movement of the patterned layer of bags from the arranging table onto the carriage the possibility of the layered arrangement being separated is minimized. A layer of arranged bags previously carried onto the carriage is indicated generally at 194.

After a layer of bags has been received on the carriage roller bed, as illustrated in FIG. 8, the roller bed and bags are shifted to the left by extension of rams 108, 110 as illustrated in FIG. 9 to place the roller bed and bags over the receiving section of the apparatus and above a pallet 190 thereon. Ram 146 then is extended to swing fence 140 down into its operative position adjacent the rear side of the layer of bags as illustrated in FIG. 9.

Rams 108, 110 then are contracted to retract the roller bed to the right toward the end of the arms 94 adjacent the downstream end of chains 76. As the roller bed is retracted, fence 140 prevents the layer of bags from returning therewith and they are wiped off the freely rotatable rollers on the roller bed and are deposited on pallet 190, as shown in FIG. 10.

The carriage and roller bed then are returned by operation of rams 112, 108, 110 to a position adjacent the downstream end of chains 76. Another patterned layer of bags then is shifted from the arranging table onto roller bed 100 by operation of power-driven chains 76 and the drive means for rollers 106. The carriage, roller bed and bags then are raised by extension of rams 112 to an elevation above the previously deposited layer of articles, as illustrated in FIG. 10. Once the carriage has reached a position above the level of the previously deposited bags rams 112 are stopped and the roller bed is extended by extension of rams 108, 110 to a position over the previously deposited layer of articles as illustrated in FIGS. 6 and 11.

As is illustrated in FIG. 6, rams 112 than are retracted to lower the carriage to press the roller bed against the tops of the bags in the previously deposited layer to flatten them somewhat. Fluid pressure sensing switch 130 in fluid supply line 120 senses when a preselected pressure has been applied to the tops of the layer of bags. When the preselected pressure is attained, a signal is routed to control circuit 126 which causes rams 112 to extend slightly to release such pressure from the layer of bags.

Fence 140 then is swung again into its operative position adjacent the back side of the layer as shown in FIG. 11. Rams 108, 110 are retracted and the roller bed shifts toward the right end of the carriage arms in FIG. 11 to wipe the layer of bags from the roller bed onto the tops of the previously deposited bags. The carriage then is lowered under power again to the elevation of chains 76 to accept another arranged layer of bags therefrom.

A tiered stack of layers prepared and stacked on a pallet is illustrated generally at 200 in FIGS. 7 and 8.

It should be understood that the apparatus may be controlled by automatic sequencing means to produce the desired turning of selected bags, shifting of an arranged layer of bags onto the roller bed, raising and lowering of the carriage and fence, and extension and retraction of the roller bed.

The apparatus described is operable quickly and efficiently to position bags as desired for stacking in a layer, and for stacking them in multiple layers. With such apparatus, the undersides of the bags are positively supported throughout operation and are positively moved by their supporting means in the direction it is desired for them to travel. With such apparatus, and the bags being positively supported and conveyed in the desired direction, the bags are able to maintain their desired shape and selected orientation within an arranged layer.

While a specific embodiment of the invention has been described herein, it should be apparent to those skilled in the art that variations and modifications are possible without departing from the spirit of the invention.

It is claimed and desired to secure by letters patent:

1. Apparatus for stacking layers of nonrigid articles one atop the other to form a stack comprising layer arranging means operable to arrange a plurality of said articles in a selected pattern to form a layer, conveyor means for supporting and carrying said arranged layer in one direction along a path toward the downstream end of said arranging means, an elongate substantially horizontal carriage mounted for vertical shifting relative to said arranging means adjacent the downsteam end thereof, said carriage extending in said one direction away from the downstream end of said conveyor, a roller bed including a plurality of rollers disposed with their upper surfaces occupying a substantially common horizontal plane for receiving and supporting said layer, said roller bed being mounted for vertical movement with said carriage and for horizontal movement longitudinally of the carriage, and said rollers being mounted for rotation about substantially horizontal axes extending transversely of said path, roller drive means for rotating said rollers under power to move an article supporting thereon in said one direction, article receiving means defining an article support surface underlying the end of said carriage opposite said layer arranging means, powered means for shifting said carriage vertically between a first position at the elevation of said layer arranging means and various adjusted positions at other elevations, powered means for shifting said roller bed horizontally on said carriage between a first position at the end of the carriage adjacent said layer arranging means and a second position adjacent the opposite end of the carriage, and transmission means interposed between said rollers of said roller bed and said roller drive means operable to produce a driving interconnection therebetween when said roller bed is at the elevation of said layer arranging means and at the end of the carriage adjacent the layer arranging means, and disengaging said driving interconnection when said roller bed is shifted therefrom to permit free rotation of said rollers.

2. The apparatus of claim 1, wherein said transmission means comprises a motor driven element mounted for engagement with one set of end portions of said rollers when said roller bed is in said position adjacent said layer arranging means.

3. The apparatus of claim 2, wherein said motor driven element comprises an elongate, endless, flexible motor driven belt having an elongate, substantially horizontal reach positioned to engage said rollers when said roller bed is adjacent said layer arranging means.

4. Apparatus for stacking layers of nonrigid articles one atop the other to form a stack comprising layer arranging means operable to arrange a plurality of said articles in a selected pattern to form a layer, conveyor means for supporting and carrying said arranged layer in one direction along a path toward the downstream end of said arranging means, an elongate substantially horizontal carriage mounted for vertical shifting relative to said arranging means adjacent the downstream end thereof, said carriage extending in said one direction away from the downstream end of said conveyor, a roller bed including a plurality of rollers disposed with their upper surfaces occupying a substantially common horizontal plane for receiving and supporting said layer, said roller bed being mounted for vertical movement with said carriage and for horizontal movement longitudinally of the carriage, and said rollers being mounted for rotation about substantially horizontal axes extending transversely of said path, roller drive means for rotating said rollers under power to move an article supported thereon in said one direction, article receiving means defining an article support surface underlying the end of said carriage opposite said layer arranging means, powered means including a double acting, fluid-actuated ram for shifting said carriage vertically between a first position at the elevation of said layer arranging means and various adjusted positions at other elevations, powered means for shifting said roller bed horizontally on said carriage between a first position at the end of the carriage adjacent said layer arranging means and a second position adjacent the opposite end of the carriage, said roller bed being shiftable to a position overlying said article receiving means and overlying a layer of articles previously deposited thereon, and said powered means for shifting said carriage vertically being operable to lower said roller bed onto said previously deposited layer to compress and flatten the top of said layer for receiving a subsequent layer thereon, and a sensor operable to sense the pressure of fluid supplied to said ram to press said carriage against the top of a layer of articles and operable to produce shifting of said carrige upwardly therefrom to release said pressure upon sensing the application of a preselected pressure.

5. Apparatus for arranging a plurality of nonrigid articles in a patterned layer with articles in the layer disposed substantially normal to each other and thereafter stacking such layer atop a preceding layer, said apparatus comprising an infeed conveyor for carrying articles in one direction along a path, rotator means in said path for lifting selected articles from said conveyor, rotating the same about an upright axis to a different orientation and then lowering the same onto said conveyor for carrying again in said one direction, layer arranging means comprising a plurality of first powered conveyor elements operable to receive an article from said infeed conveyor and support and convey the same in said one direction beyond the end of said infeed conveyor, second powered conveyor elements operable to engage the undersides of said articles on said first powered elements and support and carry said articles laterally of said one direction, said first and second powered elements being mounted for shifting vertically relative to each other between first positions in which the upper support surfaces of said first conveyor elements are above said second conveyor elements, and second positions in which said second conveyor elements are above said first conveyor elements, and powered shifting means for selectively shifting said first and second conveyor elements between said first and second positions, an elongate, substantially horizontal carriage mounted for vertical shifting relative to said layer arranging means adjacent the downstream end of the arranging means, said carriage extending from the downstream end of said arranging means laterally of said one direction a roller bed including a plurality of rollers disposed with their upper surfaces occupying a substantially common horizontal plane for receiving and supporting a layer of articles, said roller bed being mounted for vertical movement with said carriage and for horizontal movement longitudinally of the carriage, and said rollers being mounted for rotation about substantially horizontal axes extending transversely of said carriage, article receiving means defining an article support surface underlying the end of said carriage opposite said layer arranging means, powered means for shifting said carriage vertically between a first position at the elevation of said layer arranging means and various adjusted positions at other elevations, powered means for shifting said roller bed horizontally on said carriage betwen a first position at the end of the carriage adjacent said layer arranging means and a second position adjacent the opposite end of the conveyor, roller drive means for rotating said rollers under power to move articles supported thereon longitudinally of said carriage away from the downstream end of said arranging means, and transmission means interposed between said rollers on said roller bed and said roller drive means operable to produce a driving interconnection therebetween when said roller bed is at the elevation of said layer arranging means and at the end of the carriage adjacent the layer arranging means, and to disengage such interconnection when said roller bed is shifted therefrom to permit free rotation of said rollers.

* * * * *

UNITED STATES PATENT AND TRADEMARK OFFICE
CERTIFICATE OF CORRECTION

PATENT NO. : 4,067,456
DATED : January 10, 1978
INVENTOR(S) : Robert A. Schmitt

It is certified that error appears in the above-identified patent and that said Letters Patent are hereby corrected as shown below:

In column 1, line 7, delete "The" and insert therefor —This—;

In column 3, line 28, delete the numeral "67" and substitute therefor —57—;

In column 5, line 14, delete "threeposition" and substitute therefor —three-position—;

In column 6, line 23, after "alongside" insert —one side—;

In column 6, line 55, delete "end" and insert therefor —ends—;

In column 7, line 7, delete "than" and insert therefor —then—;

In column 8, line 4, delete "supporting" and insert therefor —supported—;

In column 10, line 28, delete "betwen" and insert therefor —between—.

Signed and Sealed this

Third Day of July 1979

[SEAL]

Attest:

Attesting Officer

LUTRELLE F. PARKER
Acting Commissioner of Patents and Trademarks